US011483327B2

(12) United States Patent
Hen et al.

(10) Patent No.: US 11,483,327 B2
(45) Date of Patent: Oct. 25, 2022

(54) COLLABORATIVE FILTERING ANOMALY DETECTION EXPLAINABILITY

(71) Applicant: Microsoft Technology Licensing, LLC, Redmond, WA (US)

(72) Inventors: Idan Hen, Tel Aviv (IL); Roy Levin, Haifa (IL)

(73) Assignee: Microsoft Technology Licensing, LLC, Redmond, WA (US)

(*) Notice: Subject to any disclaimer, the term of this patent is extended or adjusted under 35 U.S.C. 154(b) by 401 days.

(21) Appl. No.: 16/686,159

(22) Filed: Nov. 17, 2019

(65) Prior Publication Data

US 2021/0152581 A1   May 20, 2021

(51) Int. Cl.
*H04L 9/40* (2022.01)
*G06K 9/62* (2022.01)
*G06N 5/04* (2006.01)

(52) U.S. Cl.
CPC ........ H04L 63/1425 (2013.01); G06K 9/6256 (2013.01); G06N 5/045 (2013.01); H04L 63/1416 (2013.01); H04L 63/20 (2013.01)

(58) Field of Classification Search
CPC . H04L 63/1425; H04L 63/1416; H04L 63/20; H04L 63/104; G06K 9/6256; G06N 5/045; G06F 21/604; G06F 21/6218
USPC .......................................................... 726/23
See application file for complete search history.

(56) References Cited

U.S. PATENT DOCUMENTS

| 8,887,286 B2* | 11/2014 | Dupont | G06F 21/50 726/25 |
| 9,641,544 B1* | 5/2017 | Treat | H04L 43/04 |
| 9,998,480 B1* | 6/2018 | Gates | G06F 21/577 |
| 10,116,674 B2* | 10/2018 | Baradaran | H04L 63/1416 |
| 10,223,644 B2* | 3/2019 | Gadde | G06N 20/00 |
| 10,255,628 B2* | 4/2019 | Li | G06Q 30/0631 |

(Continued)

FOREIGN PATENT DOCUMENTS

WO    2017037443 A1    3/2017

OTHER PUBLICATIONS

ExplainingCFRecos-Herlocker.pdf {Year: 2000}.*

(Continued)

*Primary Examiner* — Badri Narayanan Champakesan
(74) *Attorney, Agent, or Firm* — Ogilvie Law Firm

(57) ABSTRACT

Cybersecurity anomaly explainability is enhanced, with particular attention to collaborative filter-based anomaly detection. An enhanced system obtains user behavior vectors derived from a trained collaborative filter, computes a similarity measure of user behavior based on a distance between user behavior vectors and a similarity threshold, and automatically produces an explanation of a detected cybersecurity anomaly. The explanation describes a change in user behavior similarity, in human-friendly terms, such as "User X from Sales is now behaving like a network administrator." Each user behavior vector includes latent features, and corresponds to access attempts or other behavior of a user with respect to a monitored computing system. Users may be sorted according to behavioral similarity. Explanations may associate a collaborative filter anomaly detection result with a change in behavior of an identified user or cluster of users, per specified explanation structures. Explanations may include organizational context information such as roles.

20 Claims, 4 Drawing Sheets

(56) References Cited

U.S. PATENT DOCUMENTS

| | | | |
|---|---|---|---|
| 10,270,790 B1* | 4/2019 | Jackson | H04L 63/1425 |
| 10,505,959 B1* | 12/2019 | Wang | G06N 20/00 |
| 10,657,250 B2* | 5/2020 | Lee | G06F 21/552 |
| 10,733,517 B2* | 8/2020 | El Mernissi | G06F 16/90335 |
| 10,740,566 B2* | 8/2020 | Sapugay | G06F 16/285 |
| 10,796,232 B2* | 10/2020 | Sengupta | G06N 5/045 |
| 10,810,616 B2* | 10/2020 | Modarresi | G06F 16/9035 |
| 10,924,330 B2* | 2/2021 | Sharma | H04W 24/10 |
| 10,986,121 B2* | 4/2021 | Stockdale | G06N 20/00 |
| 11,075,933 B1* | 7/2021 | Fetters | H04W 12/64 |
| 11,157,831 B2* | 10/2021 | Guidotti | G06N 5/02 |
| 11,244,326 B2* | 2/2022 | Ning | G06Q 30/0201 |
| 2006/0048106 A1 | 3/2006 | Citron et al. | |
| 2008/0141233 A1 | 6/2008 | Gurevich et al. | |
| 2008/0313496 A1 | 12/2008 | Prabhakaran et al. | |
| 2009/0055813 A1 | 2/2009 | Haber et al. | |
| 2015/0261649 A1 | 9/2015 | Boehm et al. | |
| 2015/0263999 A1 | 9/2015 | Levin et al. | |
| 2016/0063071 A1 | 3/2016 | Guy et al. | |
| 2016/0188711 A1 | 6/2016 | Levin et al. | |
| 2016/0217392 A1 | 7/2016 | Hashavit et al. | |
| 2017/0068746 A1 | 3/2017 | Levin et al. | |
| 2017/0220945 A1 | 8/2017 | Barger et al. | |
| 2017/0228418 A1 | 8/2017 | Levin et al. | |
| 2017/0323463 A1 | 11/2017 | Leiba et al. | |
| 2018/0152465 A1 | 5/2018 | Levin et al. | |
| 2018/0189296 A1 | 7/2018 | Ashour et al. | |
| 2018/0278633 A1 | 9/2018 | Brutzkus et al. | |
| 2018/0330257 A1* | 11/2018 | Dodson | G06N 7/005 |
| 2018/0349599 A1 | 12/2018 | Teller et al. | |
| 2019/0020671 A1* | 1/2019 | Komárek | G06F 21/552 |
| 2019/0278922 A1 | 9/2019 | Levin et al. | |
| 2020/0274894 A1* | 8/2020 | Argoeti | G06F 7/556 |

OTHER PUBLICATIONS

"International Search Report and Written Opinion Issued in PCT Application No. PCT/US20/059895", dated Feb. 23, 2021, 12 Pages.

"Why splitting the data into the training and testing set is not enough", retrieved from «https://stats.stackexchange.com/questions/168807/why-splitting-the-data-into-the-training-and-testing-set-is-not-enough», Aug. 26, 2015, 15 pages.

"Anomaly detection", retrieved from «https://en.wikipedia.org/wiki/Anomaly_detection», Feb. 18, 2019, 6 pages.

"User behavior analytics", retrieved from «https://en.wikipedia.org/wiki/User_behavior_analytics», Oct. 26, 2018, 3 pages.

"Splunk® User Behavior Analytics", retrieved from «https://www.splunk.com/pdfs/fact-sheets/splunk-user-behavior-analytics.pdf», 2015, 3 pages.

"Securonix User and Entity Behavior Analytics", retrieved from «https7/www.securonix.com/products/ueba/», no later than Feb. 9, 2019, 6 pages.

"Exabeam Advanced Analytics", retrieved from «https://www.exabeam.com/product/exabeam-advanced-analytics/», no later than Feb. 9, 2019, 4 pages.

"User Behavior Analytics (UBA)", retrieved from «https://www.rapid7.com/fundamentals/user-behavior-analytics/», no later than Feb. 9, 2019, 6 pages.

"Intelligent Security Operations", retrieved from «https://www.mcafee.com/enterprise/en-us/solutions/intelligent-security-operations.html», no later than Feb. 9, 2019, 9 pages.

"Symantec Information Centric Analytics", retrieved from «https://www.symantec.com/content/dam/symantec/docs/data-sheets/information-centric-analytics-en.pdf», 2018, 2 pages.

"CBA: RSA Cloud Behavioral Analytics", retrieved from «https://community.rsa.com/docs/DOC-86678», Sep. 11, 2018, 3 pages.

Jesús Bobadilla, et al., "Recommender Systems Clustering Using Bayesian Non Negative Matrix Factorization", retrieved from «https://ieeexplore.ieee.org/stamp/stamp.jsp?arnumber=8241787», Nov. 10, 2017, 16 pages.

Benjamin Marlin, "Collaborative Filtering: A Machine Learning Perspective", retrieved from «https://people.cs.umass.edu/~marlin/research/thesis/cfmlp.pdf», 2004, 137 pages.

"Apache Spark", retrieved from «https://en.wikipedia.org/wiki/Apache_Spark», Feb. 18, 2019, 9 pages.

George Seif, "The 5 Clustering Algorithms Data Scientists Need to Know", retrieved from «https://towardsdatascience.com/the-5-clustering-algorithms-data-scientists-need-to-know-a36d136ef68», Feb. 5, 2018, 9 pages.

"Microsoft Cloud App Security overview", retrieved from «https://docs.microsoft.com/en-us/cloud-app-security/what-is-cloud-app-security», Jan. 26, 2019, 5 pages.

"What is Azure Advanced Threat Protection?", retrieved from «https://docs.microsoft.com/en-us/azure-advanced-threat-protection/what-is-atp», Jan. 2, 2019, 5 pages.

Kenneth Wai-Ting Leung, et al., "CLR: A Collaborative Location Recommendation Framework based on Co-Clustering", retrieved from «http://www.cse.ust.hk/~dlee/Papers/sigir-11-clr-loc-recommend.pdf», 2011, 10 pages.

Ribeiro, et al., "'Why Should I Trust You?' Explaining the Predictions of Any Classifier", retrieved from «https://arxiv.org/pdf/1602.04938pdf», 2016, 10 pages.

Zhang et al., "Explainable Recommendation: A Survey and New Perspectives", retrieved from «https://arxiv.org/pdf/1804.11192.pdf», Aug. 15, 2019, 91 pages.

Abdollahi et al., "Explainable Restricted Boltzmann Machines for Collaborative Filtering", retrieved from «https://arxiv.org/pdf/1606.07129.pdf», Jun. 22, 2016, 5 pages.

Patel et al., "Gestalt: Integrated Support for Implementation and Analysis in Machine Learning", retrieved from «https://www.microsoft.com/en-us/research/wp-content/uploads/2016/02/uist2010gestalt.pdf», 2010, 10 pages.

Abdollahi et al., "Explainable Matrix Factorization for Collaborative Filtering", retrieved from «https://www.researchgate.net/profile/Behnoush_Abdollahi/publication/301616080_Explainable_Matrix_Factorization_for_Collaborative_Filtering/inks/59e0de0e0f7e9b97fbddb945/Explainable-Matrix-Factorization-for-Collaborative-Filtering.pdf?origin=publication_detail», Apr. 2016, 3 pages.

Wang et al., "A Reinforcement Learning Framework for Explainable Recommendation", retrieved from «https://www.microsoft.com/en-us/research/uploads/prod/2018/08/main.pdf», 2018, 10 pages.

Kanjirathinkal, "Explainable Recommendations", retrieved from «http://www.cs.cmu.edu/~rkanjira/thesis/rose_proposal.pdf», 2017, 65 pages.

Luo, "Introduction to Recommender System", retrieved from «https://towardsdatascience.com/intro-to-recommender-system-collaborative-filtering-64a238194a26», Dec. 10, 2018, 9 pages.

Abdollahi et al., "Using Explainability for Constrained Matrix Factorization", retrieved from «https://uknowledge.uky.edu/cgi/viewcontent.cgi?article=1017&context=ccs2», no later than Oct. 17, 2019, 1 page.

Ren, et al., "Social Collaborative Viewpoint Regression with Explainable Recommendations", retrieved from «https://cseweb.ucsd.edu/classes/fa17/cse291-b/reading/ren-social-2017.pdf», 2017, 10 pages.

Chen, et al., "SVDFeature: A Toolkit for Feature-based Collaborative Filtering", retrieved from «http://www.jmlr.org/papers/volume13/chen12a/chen12a.pdf», 2012, 4 pages.

Pan, et al., "CoFiSet: Collaborative Filtering via Learning Pairwise Preferences over Item-sets", retrieved from «http://csse.szu.edu.cn/staff/panwk/publications/Conference-SDM-13-CoFiSet.pdf», Feb. 2019, 9 pages.

"Meaning of latent features?", retrieved from «https://datascience.stackexchange.com/questions/749/meaning-of-latent-features», 2015, 6 pages.

"Latent variable", retrieved from «https://en.wikipedia.org/wiki/Latent_variable», Sep. 15, 2019, 3 pages.

Fong, et al., "Interpretable Explanations of Black Boxes by Meaningful Perturbation", retrieved from «https://arxiv.org/pdf/1704.03296.pdf», Jan. 10, 2018, 9 pages.

(56) References Cited

OTHER PUBLICATIONS

"Black box", retrieved from «https://en.wikipedia.org/wiki/Black_box», Oct. 16, 2019, 5 pages.

* cited by examiner

COLLABORATIVE FILTERING ANOMALY DETECTION EXPLAINABILITY

BACKGROUND

Computing systems, or components of computing systems, are sometimes described as a "black box". This phrase means that the internal structures, internal operations, and other aspects of the functionality details inside the "black box" system or component are not visible, or at least not readily visible. The inputs fed to the black box are generally known, as are the outputs produced by the black box, but the processing details are hidden. A black box may also be described as "opaque". The opposite characterization of a component, indicating that internal details are not hidden, may be stated as a "clear box", a "glass box", or a "white box".

Black box characteristics are sometimes useful. Traditionally, software libraries and other components may be considered more reliable and easier to use if they are modular, meaning they can be treated by a software developer as a black box. Instead of worrying about internal details, the developer need only deal with the inputs to the component and the outputs from the component. As another example, cybersecurity penetration testing may be considered more realistic if the testers take a black box approach in which they are not given any information about a target's internal security controls or protocols, because external attackers would not have such information.

However, when the correctness or completeness of black box results are in question, it may helpful or even essential to understand in detail how those results were produced. In particular, explanations which make sense to people may be desired when a machine learning model produces outputs. Such "interpretable" or "human-friendly" explanations help people understand the reasons the model produced those particular outputs instead of producing different outputs from the inputs, when different outputs are also plausible in the absence of an explanation.

SUMMARY

Some embodiments described in this document provide improved explainability in computing systems that are equipped with cybersecurity anomaly detection functionality. In particular, some embodiments help explain why a trained collaborative filter-based anomaly detection system flagged an anomaly, by highlighting a certain user behavior change in an explanation of the anomaly.

Some embodiments enhance cybersecurity anomaly explainability by obtaining at least two user behavior vectors derived from a trained collaborative filter, computing a similarity of user behavior based on a distance between user behavior vectors and a similarity threshold, and producing an explanation of a cybersecurity anomaly. The explanation is based at least on a change in user behavior similarity, and it describes the change in human-friendly terms. Each user behavior vector includes at least one latent feature, and corresponds to at least one behavior of a user with respect to a monitored computing system. These embodiments may enhance explainability of cybersecurity anomalies which are detected using the trained collaborative filter by associating, in the form of an explanation, a collaborative filter anomaly detection result with a change in behavior of an identified user.

Other technical activities and characteristics pertinent to teachings herein will also become apparent to those of skill in the art. The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. The innovation is defined with claims as properly understood, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Overview

Figure 1:
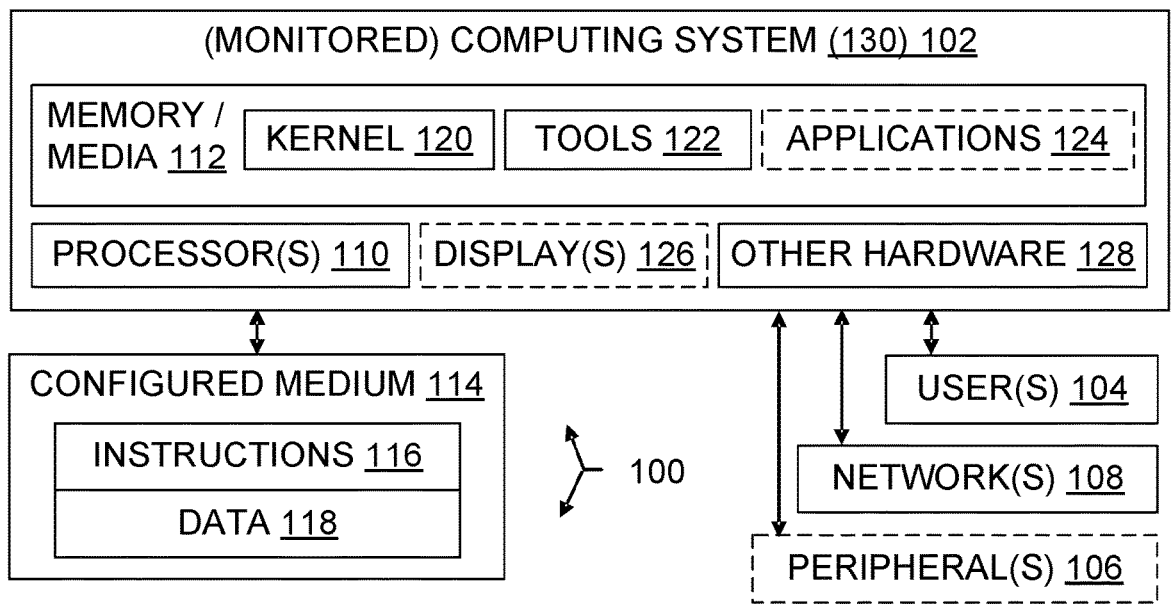
FIG. 1 is a block diagram illustrating computer systems generally and also illustrating configured storage media generally.

Innovations may expand beyond their origins, but understanding an innovation's origins can help one more fully appreciate the innovation. In the present case, some teachings described herein were motivated by technical challenges faced by Microsoft innovators who were working to improve the usability of Microsoft cybersecurity offerings. In particular, a technical challenge was to how to explain anomalies that are detected using collaborative filtering (CF), because latent features lack explainability. That is, the latent features which may characterize user behavior in a CF system often do not readily and clearly correspond with any particular resource or any familiar security rule.

A cybersecurity anomaly is an action or a set of actions that do not match expected behavior. What is "expected" or "normal" depends on how a given environment and its security controls are configured. For instance, an anomaly detection system using a naïve rule that says X file accesses per hour is normal could treat a spike in accesses near the end of a month as an anomaly, but a system using a more flexible rule that is based on logged behavior over the past several months would not treat the end-of-month spike as an anomaly.

A wide variety of approaches to anomaly detection have been devised. Approaches of particular interest here include an adaptation of collaborative filtering. Collaborative filtering is perhaps best known for its use in recommender systems, e.g., a system which tells a consumer "other people who considered buying this item also looked at the following items". A collaborative filtering recommender system may take information about a particular consumer X's purchases, look for other consumers Y and Z who made similar purchases to X, and then recommend to consumer X items that were purchased by Y or Z.

An adaptation of collaborative filtering for anomaly detection takes information about a particular user X's activities in a monitored computing system, looks for other users Y and Z who had similar activity to X, and raises an alert or otherwise flags an anomaly when X stops behaving like Y and Z. For example, if X, Y, and Z are employees in the sales department and X stops behaving like a sales employee, then an alert may be raised. Other kinds of behavior change that may be flagged are also discussed herein.

Collaborative filtering and the teachings herein define technical mechanisms for determining whether one employee is behaving like another employee, or behaving like a group of employees, for instance. Resource access count behavior is used as a motivating example, but similarity with regard to other kinds of user behavior may also be computed and used as taught herein. In addition to, or instead of, defining user behavior in terms of how many times a user accesses a resource, behavior may be defined in terms of where an access originates (IP address, time zone, or geolocation), what time of day access is requested, whether an accessed resource is modified and if so in what way, when the accessed resource was most recently previously accessed (by the user, or by anyone), how many access attempts were made within a given time period such as N minutes, or what other software was running on the user's device when the access occurred, for example.

These technical mechanisms based on collaborative filtering and user behavior similarity are more comprehensive, and more flexible, than an approach based on predefined rules. A predefined rules approach might try to define sales employee behavior using rules such as: sales employees do not access files between 2 a.m. and 5 a.m., sales employees do not access research prototype files, sales employees do not make database backups, sales employees do not run steganography software, and so on. But the number and variety of such rules is potentially enormous, so important rules might be overlooked. Such rules are also inflexible; there may be times when a sales employee has legitimate business reasons to access files between 2 a.m. and 5 a.m., for instance.

Sometimes an anomaly does not pose a serious risk, e.g., an increase in web traffic may simply reflect better-than-expected marketing results, and be well within a web server's processing capacity. At other times, an anomaly may be a symptom of an underlying or imminent security problem, e.g., increased web traffic may be part of a denial of service attack that will overwhelm the web server unless the attack is thwarted. Understanding the circumstances surrounding an anomaly can be helpful, or even essential, to an automated security control (e.g., an intrusion prevention system or a data loss prevention tool) or to a human security analyst. An anomaly's context can impact the decision-making of whoever (or whatever) is responsible for determining how to respond to the anomaly in a way that mitigates the risks to protected data and monitored computing systems.

Unfortunately, although anomaly detection based on collaborative filtering is more flexible than a naïve rule-based approach, the details underlying a collaborative filtering result are not as easily understood as those underlying rules. If a rule-based anomaly detection system produces an alert that states "user X attempted to open research prototype file antigray.docx" then the circumstances which led to the alert are clearly explained in the alert itself. By contrast, collaborative filtering anomaly detection systems have not provided similar explanations. In a collaborative filtering anomaly detection system, user behavior is captured in vectors, and most particularly in latent feature vectors, which do not typically come with a concise and clear interpretation in terms of violated rules, particular resource accesses, or other details, aside from the identity of a given user.

Accordingly, teachings are provided herein to supplement or expand collaborative filtering anomaly detection with better explainability by precisely defining user behavior similarity in computable ways that also support human-friendly meanings. Similarity computations are implementable in terms of vector distances under a cosine similarity or other vector metric, one or more numeric similarity thresholds, and one or more explanation structures, for example. Other aspects of these embodiments and other anomaly explainability enhancement embodiments are also described herein.

Operating Environments

With reference to FIG. 1, an operating environment 100 for an embodiment includes at least one computer system 102. The computer system 102 may be a multiprocessor computer system, or not. An operating environment may include one or more machines in a given computer system, which may be clustered, client-server networked, and/or peer-to-peer networked within a cloud. An individual machine is a computer system, and a group of cooperating machines is also a computer system. A given computer system 102 may be configured for end-users, e.g., with applications, for administrators, as a server, as a distributed processing node, and/or in other ways.

Human users 104 may interact with the computer system 102 by using displays, keyboards, and other peripherals 106, via typed text, touch, voice, movement, computer vision, gestures, and/or other forms of I/O. A screen 126 may be a removable peripheral 106 or may be an integral part of the system 102. A user interface may support interaction between an embodiment and one or more human users. A user interface may include a command line interface, a graphical user interface (GUI), natural user interface (NUI), voice command interface, and/or other user interface (UI) presentations, which may be presented as distinct options or may be integrated.

System administrators, network administrators, cloud administrators, security analysts and other security personnel, operations personnel, developers, testers, engineers, auditors, and end-users are each a particular type of user 104. Automated agents, scripts, playback software, devices, and the like acting on behalf of one or more people may also be users 104, e.g., to facilitate testing a system 102. Storage devices and/or networking devices may be considered peripheral equipment in some embodiments and part of a system 102 in other embodiments, depending on their detachability from the processor 110. Other computer systems not shown in FIG. 1 may interact in technological ways with the computer system 102 or with another system embodiment using one or more connections to a network 108 via network interface equipment, for example.

Each computer system 102 includes at least one processor 110. The computer system 102, like other suitable systems, also includes one or more computer-readable storage media 112. Storage media 112 may be of different physical types. The storage media 112 may be volatile memory, non-volatile memory, fixed in place media, removable media, magnetic media, optical media, solid-state media, and/or of other types of physical durable storage media (as opposed to merely a propagated signal or mere energy). In particular, a configured storage medium 114 such as a portable (i.e., external) hard drive, CD, DVD, memory stick, or other removable non-volatile memory medium may become functionally a technological part of the computer system when inserted or otherwise installed, making its content accessible for interaction with and use by processor 110. The removable configured storage medium 114 is an example of a computer-readable storage medium 112. Some other examples of computer-readable storage media 112 include built-in RAM, ROM, hard disks, and other memory storage devices which are not readily removable by users 104. For compliance with current U.S. patent requirements, neither a computer-readable medium nor a computer-readable storage medium nor a computer-readable memory is a signal per se or mere energy under any claim pending or granted in the United States.

The storage medium 114 is configured with binary instructions 116 that are executable by a processor 110; "executable" is used in a broad sense herein to include machine code, interpretable code, bytecode, and/or code that runs on a virtual machine, for example. The storage medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed by backup, restore, commits, aborts, reformatting, and/or other technical operations.

Although an embodiment may be described as being implemented as software instructions executed by one or more processors in a computing device (e.g., general purpose computer, server, or cluster), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, an embodiment may include hardware logic components 110, 128 such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. Components of an embodiment may be grouped into interacting functional modules based on their inputs, outputs, and/or their technical effects, for example.

In addition to processors 110 (e.g., CPUs, ALUs, FPUs, TPUs and/or GPUs), memory/storage media 112, and displays 126, an operating environment may also include other hardware 128, such as batteries, buses, power supplies, wired and wireless network interface cards, for instance. The nouns "screen" and "display" are used interchangeably herein. A display 126 may include one or more touch screens, screens responsive to input from a pen or tablet, or screens which operate solely for output. In some embodiments peripherals 106 such as human user I/O devices (screen, keyboard, mouse, tablet, microphone, speaker, motion sensor, etc.) will be present in operable communication with one or more processors 110 and memory.

In some embodiments, the system includes multiple computers connected by a wired and/or wireless network 108. Networking interface equipment 128 can provide access to networks 108, using network components such as a packet-switched network interface card, a wireless transceiver, or a telephone network interface, for example, which may be present in a given computer system. Virtualizations of networking interface equipment and other network components such as switches or routers or firewalls may also be present, e.g., in a software defined network or a sandboxed or other secure cloud computing environment. In some embodiments, one or more computers are partially or fully "air gapped" by reason of being disconnected or only intermittently connected to another networked device or remote cloud. In particular, anomaly explanation functionality could be installed on an air gapped system and then be updated periodically or on occasion using removable media. A given embodiment may also communicate technical data and/or technical instructions through direct memory access, removable nonvolatile storage media, or other information storage-retrieval and/or transmission approaches.

One of skill will appreciate that the foregoing aspects and other aspects presented herein under "Operating Environments" may form part of a given embodiment. This document's headings are not intended to provide a strict classification of features into embodiment and non-embodiment feature sets.

One or more items are shown in outline form in the Figures, or listed inside parentheses, to emphasize that they are not necessarily part of the illustrated operating environment or all embodiments, but may interoperate with items in the operating environment or some embodiments as discussed herein. It does not follow that items not in outline or parenthetical form are necessarily required, in any Figure or any embodiment. In particular, FIG. 1 is provided for convenience; inclusion of an item in FIG. 1 does not imply that the item, or the described use of the item, was known prior to the current innovations.

More About Systems

Figure 2:
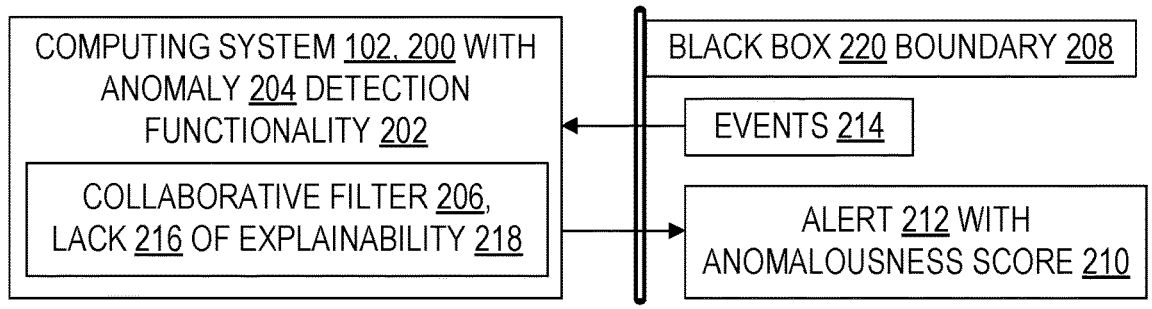
FIG. 2 is a block diagram illustrating a collaborative filtering-based cybersecurity anomaly detection system, viewed as a black box.

FIG. 2 illustrates an environment having a collaborative filtering-based cybersecurity anomaly detection system 200 which operates as a black box 220 inside a black box boundary 208. To form the system 200, a system 102 is equipped with functionality 202 for detecting cybersecurity anomalies 204, including a collaborative filter 206 adapted to perform anomaly detection.

Adaptation of a collaborative filter (CF) of the kind previously used in recommendation systems, for use in cybersecurity, may have two aspects. One aspect involves training the CF 206 by using data 118, 302 about computational resources and about user behavior in a monitored computing system 130 instead of training with data about movies, books, or other consumer items and with data about consumer behavior in an electronic commerce system. Another aspect of CF adaptation for cybersecurity involves inverting scores produced by the CF, to adapt recommendation scores for service as anomalousness scores 210. Low score values in a recommendation context correspond to high risks—associated with anomalies—in a cybersecurity anomaly detection context. Consumer goods that get a low recommendation score from a recommendation CF will tend to not be presented in purchase item recommendations, whereas resource access events 214 that get a low score from a cybersecurity CF will tend to be treated as anomalies in a cybersecurity system 200, e.g., by prompting an alert 212.

However, an alert by itself may not be very useful. What to do about the alert may depend on why the alert happened. But the reason for the alert 212 may be unclear to a human analyst 104 who is shown only the alert 212 and the particular event 214 that prompted the alert. The analyst may well wonder why this event led to an alert when other apparently similar events did not. Because the CF system 200 operates as a black box whose internal workings are hidden from the analyst, the CF system has a lack 216 of explainability 218. Yet explainability would be lacking even if internal aspects of the CF system 200 were visible, because the internal workings of a CF involve latent feature vectors 324 whose meaning is generally unclear to people. One can think of latent features 322 as pieces of a large multidimensional puzzle whose final shape emerges only when all the latent features meld together to form it. But as explained elsewhere herein, additional processing can be performed on latent feature vectors that are extracted from a CF, in order to enhance the explainability of a CF-based cybersecurity anomaly detection system 200.

Figure 3:
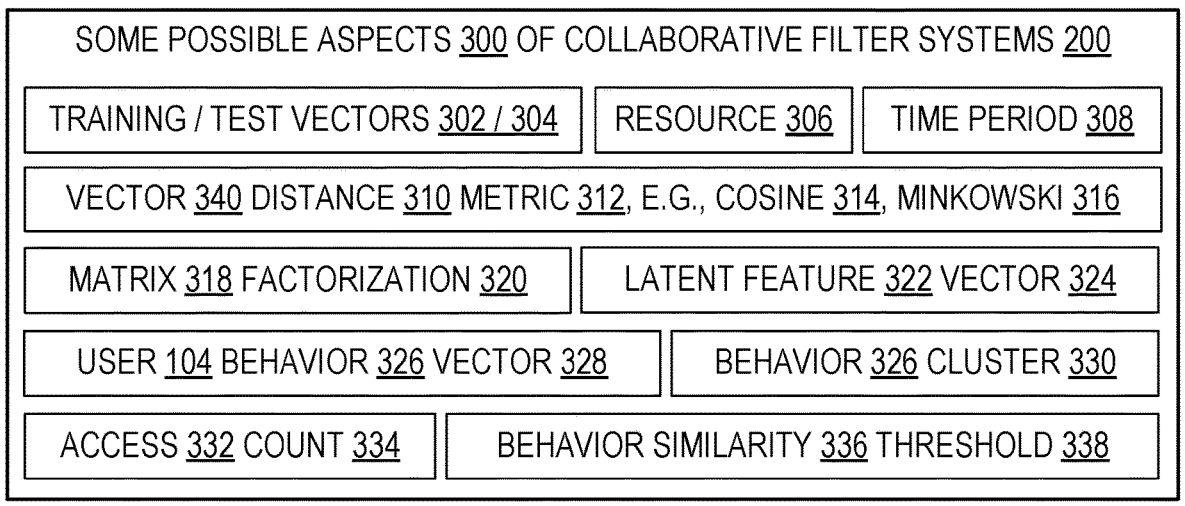
FIG. 3 is a block diagram illustrating some aspects of collaborative filtering which relate to cybersecurity anomaly explainability.

FIG. 3 illustrates various aspects 300 of CF-based cybersecurity anomaly detection systems 200. These aspects are discussed at various points herein, and additional details regarding them are provided in the discussion of a List of Reference Numerals later in this disclosure document.

Figure 4:
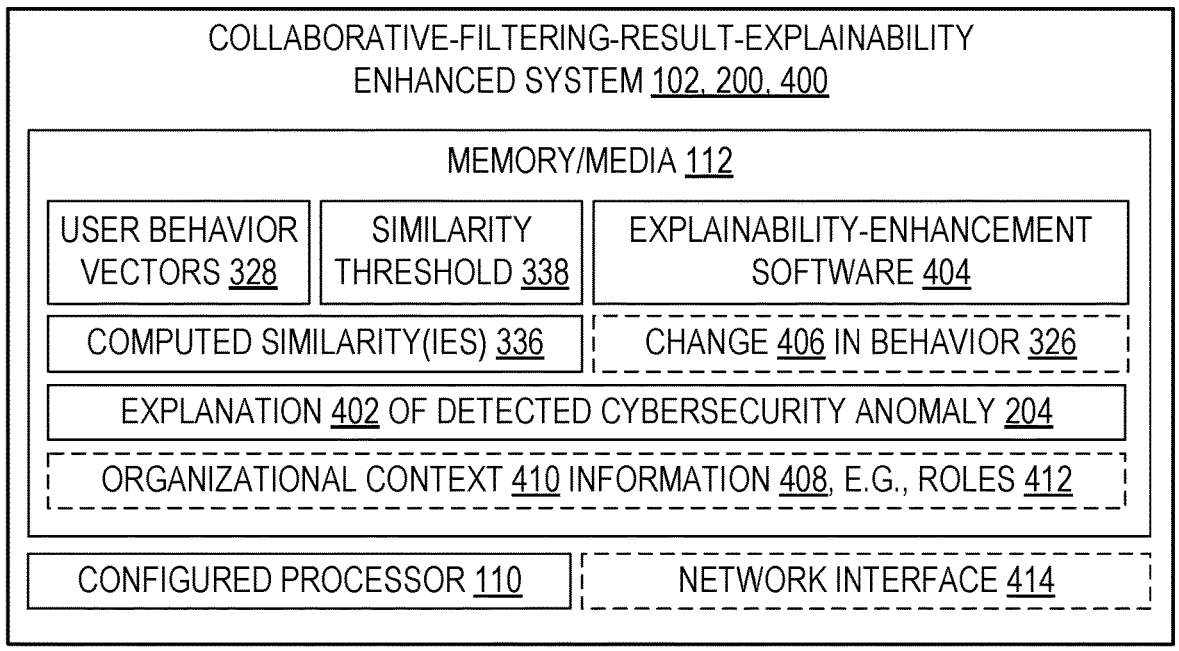
FIG. 4 is a block diagram illustrating an enhanced system configured to produce explanations of circumstances surrounding cybersecurity anomalies.

FIG. 4 illustrates an enhanced system 400 which is configured to produce explanations 402 of circumstances surrounding cybersecurity anomalies 204. The system 400 may be networked through an interface 414. The system 400 may be a CF-based cybersecurity anomaly detection system 200 which is further equipped with explainability-enhancement software 404 to compute various behavior similarities 336. Similarities may be computed in software 404 by calculating vector distances 310 between user behavior vectors 328. User behavior vectors 328 may be latent feature vectors 324 derived from the underlying CF 206 by factorization 320. User behavior vectors 328 may also or alternately be composite or mean or centroid or similar representative vectors that represent clusters 330 of such latent feature vectors 324.

In some embodiments, explainability-enhancement software 404 may also detect and respond to changes 406 in a given user's behavior 326. For example, software 404 may compute a distance between a single user's behavior vectors for different points in time 308.

Software 404 also emits explanations 402. Explanations may include human-readable text that describes changes 406, e.g., "user X previously behaved like users Y and Z but as of yesterday no longer does" or "users A and B used to behave like each other but they no longer do" or "five minutes ago user K who is a sales rep started behavior like an administrator".

In some embodiments, explanations 402 may also include information 408 describing an organizational context 410. Such information may specify a role 412, an organizational chart, contact information, or similar info. Some roles 412 are admin, sales, development, legal, finance, new hire, outside contractor, supervisor, CEO, COO, CTO, and so on.

Figure 5:
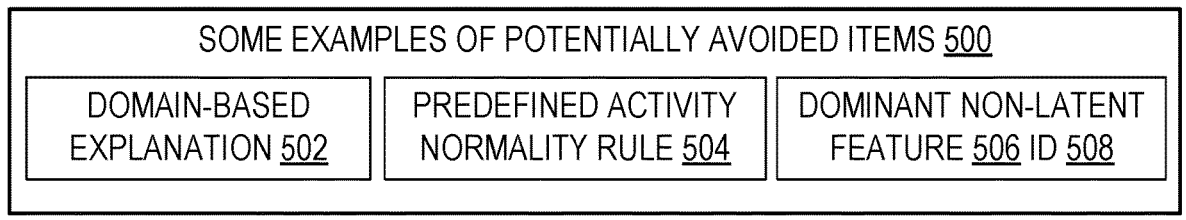
FIG. 5 is a block diagram illustrating some items which are disabled, excluded, or otherwise avoided in some embodiments.

FIG. 5 shows some items 500 which are disabled, excluded, or otherwise avoided in some embodiments. Items 500 may be avoided individually or together. The items 500 shown include domain-based explanations 502, predefined activity normality rules 504, and identifications 508 of dominant non-latent features 506. These exclusions emphasize differences between the explanatory methods, mechanisms, structures, and results taught herein and those employed in other approaches. For example, some embodiments avoid domain-based explanations 502 of events such as "traffic is unusually high for mid-month" or "this event may involve credit card data". Some embodiments avoid predefined activity normality rules 504 such as "accesses from IP addresses not on the whitelist should be investigated" or "no one except the CEO and CTO is authorized to view this file". Some embodiments avoid identifications 508 of dominant non-latent features 506 such as "this email contains the following words which are often used in phishing: 'request', 'invoice', 'urgent', 'due'", or a word frequency chart, for example.

Figure 6:
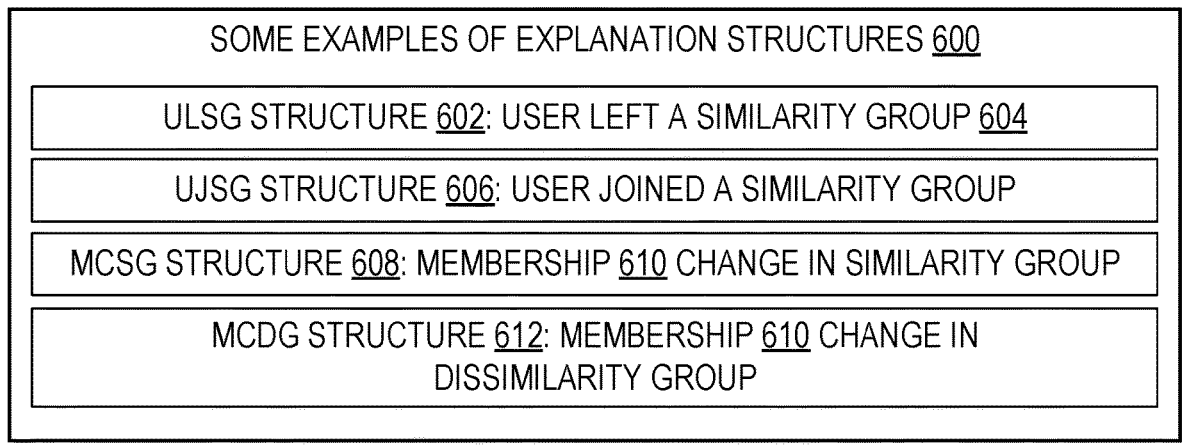
FIG. 6 is a block diagram illustrating some structures that may be used in cybersecurity anomaly explanations.

FIG. 6 lists some structures 600 that may be used in cybersecurity anomaly explanations 402 in some embodiments. These are only some of the ways in which explanations 402 may be structured. Also, although written textual examples are given here, graphical explanations, audible explanations, or combinations of text, images, and sounds, may also be provided as explanations 402 in some embodiments.

In a ULSG structure 602, an explanation 402 is structured to state or otherwise indicate that a user left a similarity group. A similarity group is a group 604 of users who have (or at the relevant time had) similar behavior 326 to one another per an applicable vector metric 312 and threshold 338. For example, the following is an explanation 402 with ULSG structure 602 in which the similarity group includes users F1, F2, F3: "User S previously behaved like users F1, F2, F3 of the finance department but now S does not behave like those finance department users."

In a UJSG structure 606, an explanation 402 is structured to state or otherwise indicate that a user joined a similarity group. For example, the following is an explanation 402 with UJSG structure 606 in which the similarity group includes users A1, A2: "User S did not previously behave like users A1, A2 of the admin group but now S does behave like those admin group users." Another explanation 402 with UJSG structure 606 is: "User K's behavior has changed. User K now behaves like highly trusted group users A1, A2, CISO, and COO."

In an MCSG structure 608, an explanation 402 is structured to state or otherwise indicate that membership 610 of a similarity group has changed. For example, the following are explanations 402 with MCSG structure 608: "User K no longer behaves like the users who belong to a group of limited access vendor users." "More users behaved like data scientists yesterday than the day before yesterday."

In an MCDG structure 612, an explanation 402 is structured to state or otherwise indicate that membership 610 of a dissimilarity group has changed. A dissimilarity group is a group 604 of users who have (or at the relevant time had) dissimilar behavior 326 to one another per an applicable vector metric 312 and threshold 338, that is, they did not have similar behavior 326. For example, the following is an explanation 402 with MCDG structure 612: "User Z previously behaved differently than the average finance department user and differently than the average sales department user and differently than the average admin group user, but now Z behaves a lot like a finance department user."

Some embodiments use or provide an anomaly explanation functionality-enhanced system, such as system 400, or another system 102 that is enhanced as taught herein. In such as system, a comparison of user behavior vectors may be triggered by a CF anomaly detection. An explanation system for enhancing cybersecurity anomaly explainability system includes a memory 112, and a processor 110 in operable communication with the memory. The processor 110 is configured in to perform cybersecurity anomaly 204 explanation steps which include (a) obtaining at least two user behavior vectors 328, each user behavior vector derived from a trained collaborative filter 206, each user behavior vector including at least one latent feature 322, each user behavior vector corresponding to at least one behavior 326 of a user with respect to a monitored computing system 130, (b) computing a similarity 336 of user behavior based on a distance 310 between user behavior vectors and a similarity threshold 338, and (c) producing an explanation 402 of a cybersecurity anomaly which is based at least on a change 406 in user behavior similarity and which describes the change in user behavior similarity. This system enhances explainability 218 of cybersecurity anomalies which are detected using the trained collaborative filter by associating in the explanation 402 a collaborative filter anomaly detection result 212 with a change in behavior of an identified user 104.

One of skill will acknowledge from review of the teachings herein that there are at least two broad possibilities for behavior changes 406 that are detected by comparing vectors. One possibility is that two distinct users who previously had similar behavior 326 to one another are no longer behaving similarly. Another possibility is that a particular user's recent behavior is not similar to that same user's previous (or later) behavior. Accordingly, in some embodiments, the user behavior vectors 328, vector distance 310, and explanation 402 each reside in and configure the memory 112, and the user behavior vectors are further characterized in at least one of the following ways: two of the user behavior vectors identify at least two different users, or two of the user behavior vectors identify the same user and have respective latent features 322 which correspond to behavior of that user at different times 308.

In some embodiments, the vector distance 310 is calculated using at least one of the following: a cosine similarity 314, or a Minkowski distance 316.

Some embodiments expressly include the collaborative filter 206, while others do not include the CF 206 as part of the embodiment per se. One of skill will acknowledge after review of the teachings herein that although embodiments generally use results of collaborative filtering (such as anomaly detection or an anomalousness score) and use CF latent feature vectors (i.e., user behavior vectors), an embodiment does not necessarily include the collaborative filter itself.

In some embodiments, the explanation 402 resides in and configures the memory 112, and the explanation is further characterized in that the explanation indicates at least one of the following user behavior similarity changes 406: a user whose behavior was similar to behaviors of a group X of other users stopped being similar to behaviors of group X users, a user whose behavior was not similar to behaviors of a group X of other users started being similar to behaviors of group X users, membership 610 of a group of users whose behavior is similar has changed, or membership 610 of a group of users whose behavior is not similar has changed.

Some embodiments do not require predefined rules 504 that are unrelated to the trained collaborative filter, such as predefined rules about violating a predefined behavior constraint (running a potentially malicious executable file, accessing a potentially malicious domain, etc.). Some embodiments expressly avoid such rules. In some, the configured processor 110 neither executes nor relies for explainability 218 upon any predefined activity normality rule 504 which is independent of latent-feature-vector-distance-based similarity computation.

Some embodiments do not require explanations that list dominant features, and some expressly avoid such lists or displays. In some, the configured processor 110 neither executes nor relies for explainability 218 upon any presentation 508 of multiple dominant non-latent features 506 other than user identification features. Features other than user identification features may be allowed, so that an explanation 402 can include a username or other user identification that also happens to be part of a vector.

Other system embodiments are also described herein, either directly or derivable as system versions of described processes or configured media, informed by the extensive discussion herein of computing hardware.

Although specific architectural examples are shown in the Figures, an embodiment may depart from those examples. For instance, items shown in different Figures may be included together in an embodiment, items shown in a Figure may be omitted, functionality shown in different items may be combined into fewer items or into a single item, items may be renamed, or items may be connected differently to one another.

Examples are provided in this disclosure to help illustrate aspects of the technology, but the examples given within this document do not describe all of the possible embodiments. A given embodiment may include additional or different technical features, mechanisms, sequences, data structures, or functionalities for instance, and may otherwise depart from the examples provided herein.

Processes (a.k.a. Methods)

Figure 7:
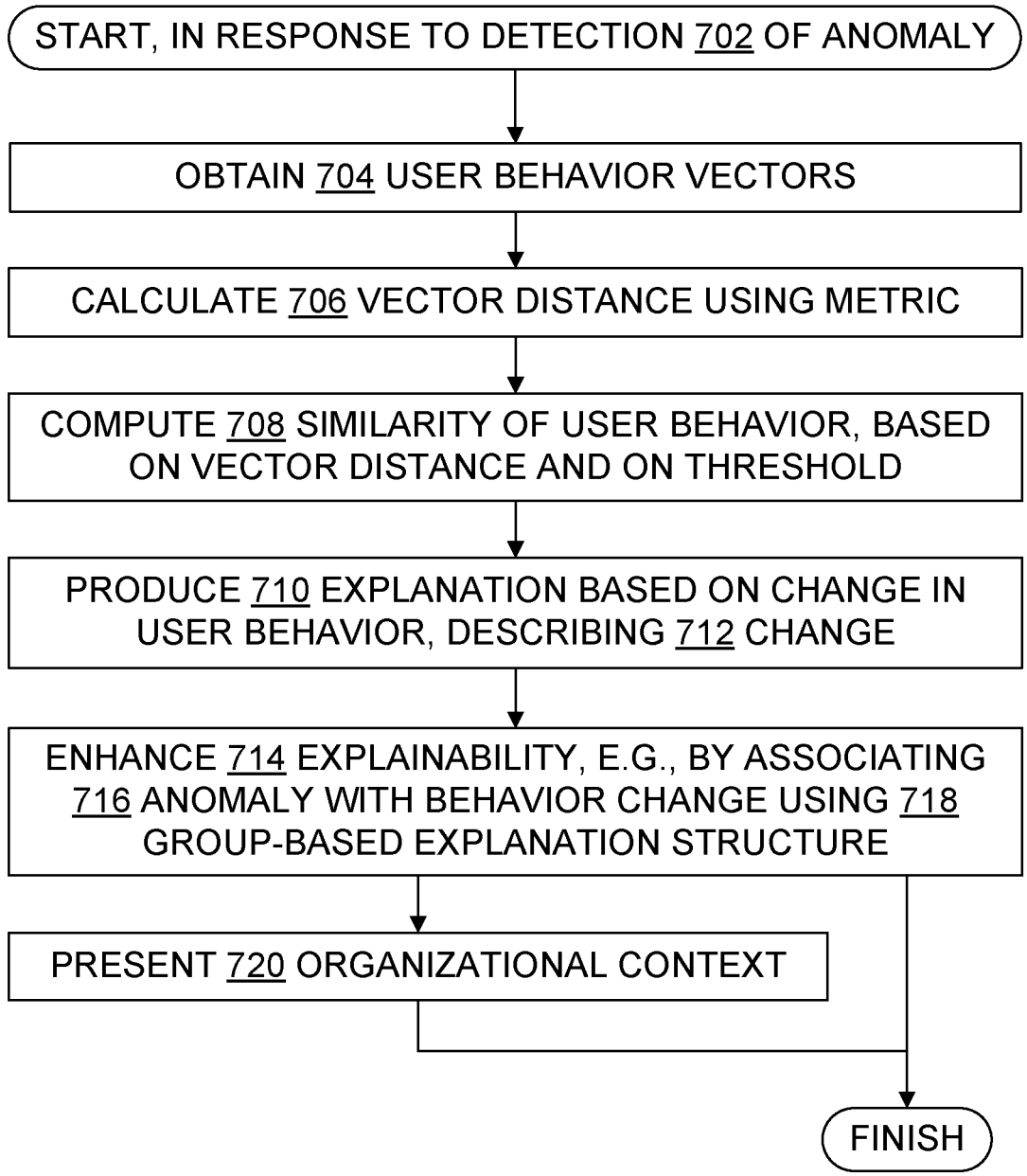
FIG. 7 is a flowchart illustrating steps in some cybersecurity anomaly explanation methods.
Figure 8:
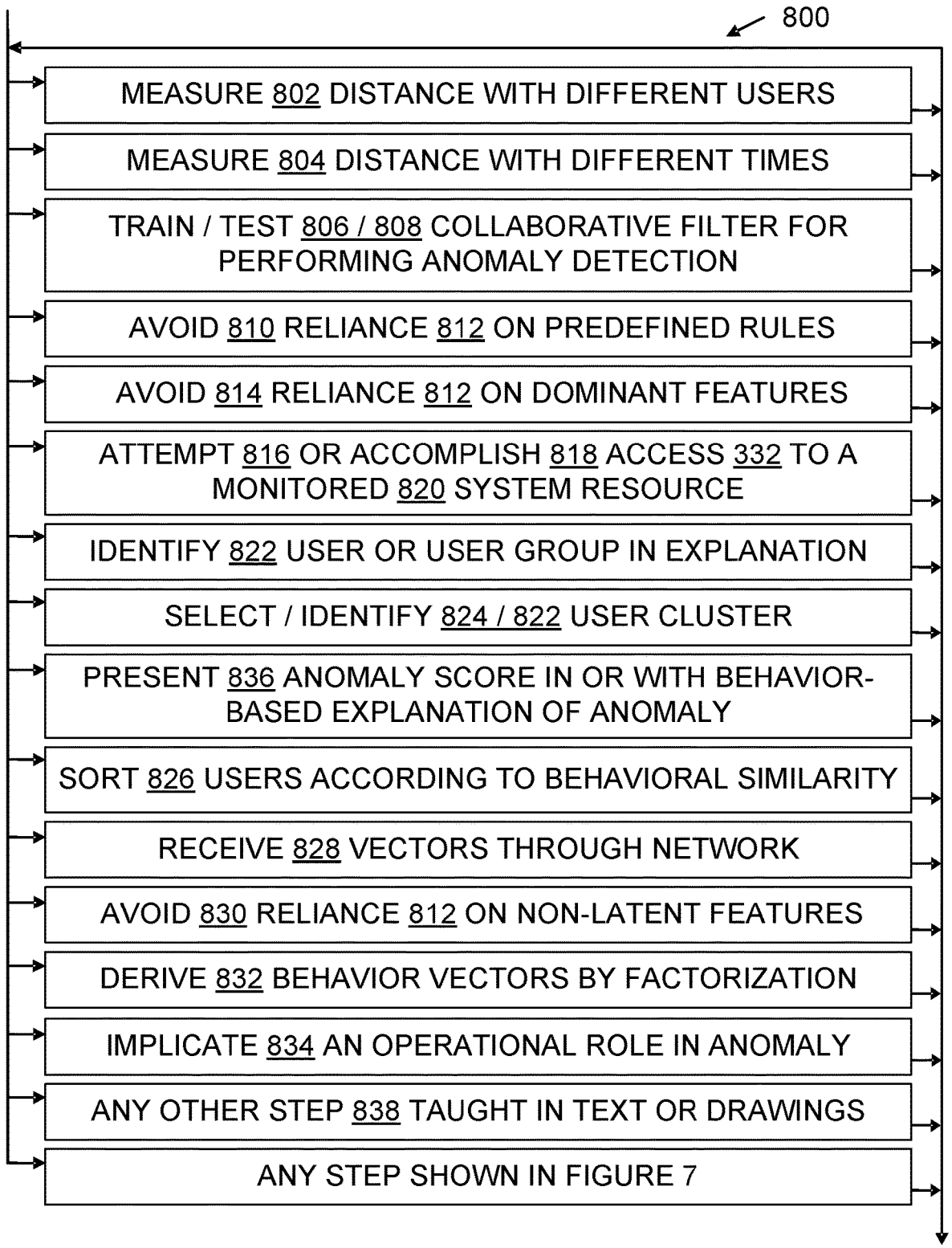
FIG. 8 is a flowchart further illustrating steps in some cybersecurity anomaly explanation methods.

FIG. 7 illustrates a family of methods 700 that may be performed or assisted by an enhanced system, such as system 400, or another explainability functionality-enhanced system as taught herein. FIG. 8 further illustrates anomaly explanation methods (which may also be referred to as "processes" in the legal sense of that word) that are suitable for use during operation of a system which has innovative functionality taught herein. FIG. 8 includes some refinements, supplements, or contextual actions for steps shown in FIG. 7. FIG. 8 also incorporates steps shown in FIG. 7. Technical processes shown in the Figures or otherwise disclosed will be performed automatically, e.g., by an enhanced SIEM tool 122, 400, unless otherwise indicated. Processes may also be performed in part automatically and in part manually to the extent action by a human administrator or other human person is implicated, e.g., in some embodiments a human administrator may specify a behavior similarity threshold value. No process contemplated as innovative herein is entirely manual. In a given embodiment zero or more illustrated steps of a process may be repeated, perhaps with different parameters or data to operate on. Steps in an embodiment may also be done in a different order than the top-to-bottom order that is laid out in FIGS. 7 and 8. Steps may be performed serially, in a partially overlapping manner, or fully in parallel. In particular, the order in which flowchart 700 action items or flowchart 800 action items are traversed to indicate the steps performed during a process may vary from one performance of the process to another performance of the process. The flowchart traversal order may also vary from one process embodiment to another process embodiment. Steps may also be omitted, combined, renamed, regrouped, be performed on one or more machines, or otherwise depart from the illustrated flow, provided that the process performed is operable and conforms to at least one claim.

Some embodiments use or provide a method for enhancing cybersecurity anomaly explainability, including the following automatic steps: obtaining 704 at least two user behavior vectors, each user behavior vector derived 832 from a trained collaborative filter, each user behavior vector including multiple latent features which individually or collectively correspond to at least one behavior 326 of a user with respect to attempted or accomplished access to at least one resource of a monitored computing system; computing 708 a similarity of user behavior based on a distance between user behavior vectors and a similarity threshold; and producing 710 an explanation of a cybersecurity anomaly detected 702 by the trained collaborative filter, the explanation being based at least on a change 406 in user behavior similarity, the explanation describing 712 the change in user behavior similarity and identifying 822 at least one user or identifying 822 at least one group of users.

In some embodiments, the method further includes selecting 824 one or more clusters of users based on user behavior vector similarity, and producing 710 the explanation 402 includes identifying 822 at least one cluster 330 in the explanation. Familiar clustering algorithms such as K-means, DBSCAN, or agglomerative hierarchical clustering can be used to select 824 clusters in a collection of user behavior vectors. In some embodiments, the individual actual users 104 that belong to the cluster are not necessarily identified in an anomaly explanation 402. A hypothetical or virtual or aggregate user may be presented instead in the explanation. Thus, for the purpose of explanation a cluster of users may be personified as a "typical" finance department user or an "average" human resources employee or a "normal" system administrator or a "usual" external vendor, for example.

In some embodiments, obtaining 704 includes obtaining a user behavior vector of an abnormal user and obtaining user behavior vectors of other users; computing 708 includes computing user behavior similarities based on distances between the abnormal user behavior vectors and at least some other user behavior vectors; and producing 710 includes producing an explanation which lists N other users whose behavior is most similar to behavior of the abnormal user, with N>=2. For instance, an embodiment may find the top ten or top five (N=10, N=5) users who are most similar to an abnormal user, and display them for a security analyst or other viewer. The "abnormal user" is the user identified by the collaborative filter 206 in connection with the detection 702 of an anomaly 204.

In some embodiments, the method further includes sorting 826 multiple users according to their respective extent of user behavior similarity to at least one of the following: behavior of another user, or behavior of a set of users. For instance, sorting 826 can be based on similarity 336 to a particular user such as an abnormal user or a highly trusted user, or based on similarity 336 to a set of users such as finance department users or external vendors.

Explanations 402 can be provided in addition to traditional anomaly scores. In some embodiments, the method further includes presenting 836 an anomaly score 210 in or with the explanation 402. The anomaly score 210 is a numeric measure of anomalousness, which is generated by use of the trained collaborative filter 206.

In some embodiments, the method further includes presenting 720 organizational context information 408 in or with the explanation 402. For instance, explanations can be provided with additional info 408 such as roles 412, organizational charts, and the like.

In some embodiments, the computationally heavy work of collaborative filtering can be done apart from the often lighter work of producing explanations. In some, obtaining 704 includes receiving 828 at least some of the user behavior vectors 328 through a network connection 414, after the received user behavior vectors have been derived 832 from the trained collaborative filter on a different computer 102.

One of skill will acknowledge in view of teachings herein that vector distance presumptively depends on latent features 322, not on features that have a clear meaning on their own. In some embodiments, distance 310 between user behavior vectors does not depend on non-latent vector components. For instance, non-latent vector components such as user IDs may be omitted from distance 310 calculations.

Configured Storage Media

Some embodiments include a configured computer-readable storage medium 112. Storage medium 112 may include disks (magnetic, optical, or otherwise), RAM, EEPROMS or other ROMs, and/or other configurable memory, including in particular computer-readable storage media (which are not mere propagated signals). The storage medium which is configured may be in particular a removable storage medium 114 such as a CD, DVD, or flash memory. A general-purpose memory, which may be removable or not, and may be volatile or not, can be configured into an embodiment using items such as explainability-enhancement software 404, anomaly explanations 402, user behavior vectors 328, and similarity thresholds 338, in the form of data 118 and instructions 116, read from a removable storage medium 114 and/or another source such as a network connection, to form a configured storage medium. The configured storage medium 112 is capable of causing a computer system 102 to perform technical process steps for cybersecurity anomaly explanation, as disclosed herein. The Figures thus help illustrate configured storage media embodiments and process (a.k.a. method) embodiments, as well as system and process embodiments. In particular, any of the process steps illustrated in FIG. 7 or 8, or otherwise taught herein, may be used to help configure a storage medium to form a configured storage medium embodiment.

Some embodiments use or provide a computer-readable storage medium 112, 114 configured with data 118 and instructions 116 which upon execution by at least one processor 110 cause a computing system to perform a method for enhancing cybersecurity anomaly explainability. This method includes: obtaining 704 a plurality of user behavior vectors, each user behavior vector including multiple latent features, each user behavior vector corresponding to at least one behavior of a user with respect to a monitored computing system; computing 708 a similarity of user behavior based on a distance between user behavior vectors and a similarity threshold; and producing 710 a textual explanation of a cybersecurity anomaly, the textual explanation based at least on a change in user behavior similarity, and the textual explanation describing 712 a change in user behavior similarity pertaining to at least one user who is identified 822 in the textual explanation.

In some embodiments, producing 710 a textual explanation of a cybersecurity anomaly includes implicating 834 an operational role in the cybersecurity anomaly.

In some embodiments, obtaining 704 a plurality of user behavior vectors includes deriving 832 user behavior vectors from a trained collaborative filter by performing 320 a matrix factorization.

In some embodiments, the method is free of reliance 812 on any predefined domain-based explanation 502 for cybersecurity anomaly explainability. In some, the method is free of reliance 812 on any display of specific dominant features 506 for cybersecurity anomaly explainability.

ADDITIONAL EXAMPLES AND OBSERVATIONS

One of skill will recognize that not every part of this disclosure, or any particular details therein, are necessarily required to satisfy legal criteria such as enablement, written description, or best mode. Any apparent conflict with any other patent disclosure, even from the owner of the present innovations, has no role in interpreting the claims presented in this patent disclosure. With this understanding, which pertains to all parts of the present disclosure, some additional examples and observations are offered.

Some embodiments enhance explainability for collaborative-filtering-based anomaly detection. In some embodiments, collaborative filtering 206 for user behavior anomaly detection leverages collaborative filtering tools and techniques for security use by scoring attempts to access items in digital storage 112. For example, accessor IDs and storage item IDs may be used to compute recommendation scores which then operate as inverse measures of intrusion risk. Actions taken in response to recommendation scores that fall below a specified threshold may include preventing or terminating access, or alerting an administrator, for instance. A requested access 332 may be allowed when the computed recommendation score is above a specified threshold, which indicates an acceptably low risk that the access is an unauthorized intrusion. Such cybersecurity technologies may be used by, or incorporated within, cloud services, cloud infrastructure, or virtual machines. Such cybersecurity technologies may also be used outside a cloud, e.g., on individual servers or on server clusters or on storage area networks that are not necessarily part of a cloud.

In some embodiments, a machine learning model is trained using tuples 340 that identify an actor, a resource, and a rating based on a normalized count of the actor's attempts 816 to access the resource. Actors may be users, groups, IP addresses, or otherwise defined. Resources may be storage, virtual machines, APIs, or otherwise defined. A risk assessor code feeds an actor—resource pair to the trained model, which computes a recommendation score using collaborative filtering 206. The risk assessor inverts the recommendation score to obtain a risk measurement; a low recommendation score corresponds to a high risk, and vice versa. The risk assessor code or other code takes cybersecurity action based on the recommendation score. Code may accept a risk R, or aid mitigation of the risk R, where R denotes a risk that the scored pair represents an unauthorized attempt by the pair actor to access the pair resource.

Security explainability 218 involves guiding a security analyst in making sense of circumstances around a security interpretation of an anomaly 204. Reasoning may be critical to cyber security professionals when trying to investigate a detected incident, e.g., to avoid wasting time on avenues of investigation that will likely be fruitless. An investigation can take hours and even days per incident, and relevant information can drastically cut the investigation time, or even give the security expert reasons to forgo the investigation altogether.

As collaborative filtering decisions are based on learning user similarity, some embodiments provide or use an efficient and precise method to explain the results of a collaborative filtering anomaly score. For example, some find the top most similar users to an abnormal user and their peers, and display the result in the user experience (interface) for the security analyst. This list of top similar users may be generated using the distance 310 of the suspected user's latent feature vector from the latent feature vectors of other users. A familiar distance metric between latent vectors is cosine distance 310; other familiar or hereafter created metrics 312 may also be used.

An embodiment produces 710 an explanation, given to the security researcher, which provides a clear and complete picture of the reason behind the anomaly. For example, and explanation may say: "The user foobar which usually exhibits similar behavior to users <<list of data scientists in his team>> recently exhibited behavior similar to <<list of admin users>>. This behavior is outside of the user's typical profile". In this example, text with << >> would be replaced in an actual explanation 402 by a list of usernames or other user identification 822.

Notably, embodiments provide benefits such as accuracy and scalability in real-world production systems. Automatically produced explanations 402 provides precise reasoning for the model 206 output, based on the actual latent feature vectors 324 created during training, and all in an automatic and scalable way.

Some approaches rely on predefined domain-based explanations 502 in the form of predefined rules 504 to explain security incidents. These explanations are tailored to scenarios in which a behavior violated a specific constraint, e.g., running a potentially malicious executable file, accessing a potentially malicious domain, or a successful login from a brute force attacker. But in very short time margins such rules 504 may become inaccurate, and even wasteful, unless they are continually updated, which makes this approach not scalable for large production systems like those managed by cloud providers. Since those predefined rules 504 are not directly related to the CF model 206, the rules will be inaccurate where a problem has very large set of possible outcomes. By contrast, some embodiments taught herein provide automatic reasoning of the results 212, with no need for maintaining predefined rules 504. Such embodiments are highly scalable and meet the needs of cloud-based products. Their explanations 402 are more accurate, because they are built using the actual latent feature vectors 324, 328 that are learned by the collaborative filtering model 206.

In some approaches, explaining artificial intelligence decisions focuses around specific dominant features 506 that can be identified as dominant in order to explain an algorithmic decision. A basic part of this approach is finding the most dominant features. However, this is not relevant for a collaborative filtering (CF) based approach as the features in CF are latent, hence, they have no interpretable meaning. Latent features produced by CF do not, in and of themselves, help explain the CF results in a useful way. The CF model 206 itself doesn't receive explanatory features, but creates a latent feature vector while learning all of the users patterns. Those latent features have no concrete meaning per se, so explaining their contribution in this way has no value. By contrast, some embodiments taught herein perform additional processing on the latent features learnt by the model, e.g., calculating 706 distances and computing 708 similarities and describing 712 changes, allowing these embodiments to explain the anomaly by showing how a user X changes its behavior and now behaves like a very different group of users. For instance, if a user X typically behaves like other users in the finance department, an explanation may reveal that X is currently behaving like system administrators. This processing gives a much more accurate reasoning since it's based on the model latent features. It also provides a much clearer explanation, with a usable security context for the analyst. Such embodiments can be used to enhance explainability in many security products. Rather than merely providing scores 210, providing a scored event with an explanation 402 makes it a lot more actionable and meaningful.

Some embodiments operate generally as follows. Samples 302 describing events 214 are fed into a collaborative filter 206 as training data. This may be done offline (relative to the security analyst). When data 118, 214 representing suspect activity is fed to it, the trained collaborative filter 206 outputs a user vector 328 which explicitly identifies a user 104 and implicitly identifies behavior 326 of the user. This may be done online (e.g., directly in response to a request from the security analyst). User vectors 328 from the collaborative filter are compared 706 to each other using a distance metric 312, e.g., cosine 314. This may be done online. The security analyst can use vector similarity 336 measurements in various ways to enhance security. For example, the analyst may obtain and compare a list of the N (e.g., N=ten) user vectors most similar to each other before suspicious activity with the N most similar user vectors after the suspicious activity. Users who were added to the list, or users who dropped off the list, have changed 406 their behavior enough to deserve closer inspection. As another example, the system 400 could partition all users into clusters 330 based on user vector similarity, and then alert 212, 710 the security analyst when any cluster of most similar user vectors changes. This change may indicate, for example, that a user who used to be most similar in behavior to users in the data scientist group is now more similar to finance users than to the data scientist users.

Some aspects of some embodiments were explored in an internal proof-of-concept study using so-called "toy examples" of user vectors 328. For example, suppose users from the Finance department named fin1, fin2 and fin3 tend to have a latent feature vector around (1, 0, 0), and suppose admin users admin1 and admin2 have a latent feature vector around (1, 1, 1). Then, given new data indicating that user fin3 from Finance that usually has a vector around (1, 0, 0) now has a vector around (1, 1, 1) an explanation could be stated as: "user fin3 which usually has similar behavior to users fin1 and fin2 is now behaving like users admin1 and admin2." The values 0 and 1 in these vectors, like other latent feature values, do not explicitly representing interpretable properties such as age and number of years in the company. The feature vectors here are latent, that is, it is an internal representation used by CF algorithm to represent the user's behavior based on the user's access pattern. Hence the values of the latent features of each user do not have any human interpretable meaning. What matters more is how they relate to other user vectors, as set forth in explanations 402.

Additional support for the discussion above is provided below. For convenience, this additional support material appears under various headings. Nonetheless, it is all intended to be understood as an integrated and integral part of the present disclosure's discussion of the contemplated embodiments.

Technical Character

The technical character of embodiments described herein will be apparent to one of ordinary skill in the art, and will also be apparent in several ways to a wide range of attentive readers. Some embodiments address technical activities such as anomaly detection through collaborative filtering based on events in a monitored computing system, vector distance calculations, matrix factorization, and automated production of cybersecurity anomaly explanations, which are each activities deeply rooted in computing technology. Some of the technical mechanisms discussed include, e.g., vector distance metric 312 calculations, latent feature vector similarity 336 computations, explanation structures 600, and explainability-enhancement software 404. Some of the technical effects discussed include, e.g., increased automation of anomaly explanation production, increased explainability of anomalies detected by an adaptation of collaborative filtering, and linkage of behavior changes with anomalies and users. Thus, purely mental processes are clearly excluded. Other advantages based on the technical characteristics of the teachings will also be apparent to one of skill from the description provided.

Some embodiments described herein may be viewed by some people in a broader context. For instance, concepts such as behavior, detection, distance, filtering, meaning, and normalcy, may be deemed relevant to a particular embodiment. However, it does not follow from the availability of a broad context that exclusive rights are being sought herein for abstract ideas; they are not. Rather, the present disclosure is focused on providing appropriately specific embodiments whose technical effects fully or partially solve particular technical problems, such as how to automatically describe to a human analyst or other person relevant circumstances pertaining to a cybersecurity anomaly detected by an adapted collaborative filter. Other configured storage media, systems, and processes involving behavior, detection, distance, filtering, meaning, or normalcy are outside the present scope. Accordingly, vagueness, mere abstractness, lack of technical character, and accompanying proof problems are also avoided under a proper understanding of the present disclosure.

ADDITIONAL COMBINATIONS AND VARIATIONS

Any of these combinations of code, data structures, logic, components, communications, and/or their functional equivalents may also be combined with any of the systems and their variations described above. A process may include any steps described herein in any subset or combination or sequence which is operable. Each variant may occur alone, or in combination with any one or more of the other variants. Each variant may occur with any of the processes and each process may be combined with any one or more of the other processes. Each process or combination of processes, including variants, may be combined with any of the configured storage medium combinations and variants described above.

More generally, one of skill will recognize that not every part of this disclosure, or any particular details therein, are necessarily required to satisfy legal criteria such as enablement, written description, or best mode. Also, embodiments are not limited to the particular motivating examples, vector distance metrics, feature examples, explanation texts, software processes, development tools, identifiers, data structures, data organizations, notations, control flows, pseudocode, naming conventions, or other implementation choices described herein. Any apparent conflict with any other patent disclosure, even from the owner of the present innovations, has no role in interpreting the claims presented in this patent disclosure.

ACRONYMS, ABBREVIATIONS, NAMES, AND SYMBOLS

Some acronyms, abbreviations, names, and symbols are defined below. Others are defined elsewhere herein, or do not require definition here in order to be understood by one of skill.
ALU: arithmetic and logic unit
API: application program interface
BIOS: basic input/output system
CD: compact disc
CF: collaborative filter, collaborative filtering
CPU: central processing unit
DVD: digital versatile disk or digital video disc
FPGA: field-programmable gate array
FPU: floating point processing unit
GPU: graphical processing unit
GUI: graphical user interface
HTTP: hypertext transfer protocol; unless otherwise stated, HTTP includes HTTPS herein
HTTPS: hypertext transfer protocol secure
IaaS or IAAS: infrastructure-as-a-service
ID: identification or identity
IoT: Internet of Things
IP: internet protocol
LAN: local area network
OS: operating system
PaaS or PAAS: platform-as-a-service
RAM: random access memory
ROM: read only memory
SIEM: security information and event management; also refers to tools which provide security information and event management
TCP: transmission control protocol
TPU: tensor processing unit
UEFI: Unified Extensible Firmware Interface
URI: uniform resource identifier
URL: uniform resource locator
WAN: wide area network

SOME ADDITIONAL TERMINOLOGY

Reference is made herein to exemplary embodiments such as those illustrated in the drawings, and specific language is used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise the right to specific and chosen lexicography. Quoted terms are being defined explicitly, but a term may also be defined implicitly without using quotation marks. Terms may be defined, either explicitly or implicitly, here in the Detailed Description and/or elsewhere in the application file.

As used herein, a "computer system" (a.k.a. "computing system") may include, for example, one or more servers, motherboards, processing nodes, laptops, tablets, personal computers (portable or not), personal digital assistants, smartphones, smartwatches, smartbands, cell or mobile phones, other mobile devices having at least a processor and a memory, video game systems, augmented reality systems, holographic projection systems, televisions, wearable computing systems, and/or other device(s) providing one or more processors controlled at least in part by instructions. The instructions may be in the form of firmware or other software in memory and/or specialized circuitry.

A "multithreaded" computer system is a computer system which supports multiple execution threads. The term "thread" should be understood to include code capable of or subject to scheduling, and possibly to synchronization. A thread may also be known outside this disclosure by another name, such as "task," "process," or "coroutine," for example. However, a distinction is made herein between threads and processes, in that a thread defines an execution path inside a process. Also, threads of a process share a given address space, whereas different processes have different respective address spaces. The threads of a process may run in parallel, in sequence, or in a combination of parallel execution and sequential execution (e.g., time-sliced).

A "processor" is a thread-processing unit, such as a core in a simultaneous multithreading implementation. A processor includes hardware. A given chip may hold one or more processors. Processors may be general purpose, or they may be tailored for specific uses such as vector processing, graphics processing, signal processing, floating-point arithmetic processing, encryption, I/O processing, machine learning, and so on.

"Kernels" include operating systems, hypervisors, virtual machines, BIOS or UEFI code, and similar hardware interface software.

"Code" means processor instructions, data (which includes constants, variables, and data structures), or both instructions and data. "Code" and "software" are used interchangeably herein. Executable code, interpreted code, and firmware are some examples of code.

"Program" is used broadly herein, to include applications, kernels, drivers, interrupt handlers, firmware, state machines, libraries, and other code written by programmers (who are also referred to as developers) and/or automatically generated.

A "routine" is a callable piece of code which normally returns control to an instruction just after the point in a program execution at which the routine was called. Depending on the terminology used, a distinction is sometimes made elsewhere between a "function" and a "procedure": a function normally returns a value, while a procedure does not. As used herein, "routine" includes both functions and procedures. A routine may have code that returns a value (e.g., sin(x)) or it may simply return without also providing a value (e.g., void functions).

"Service" means a consumable program offering, in a cloud computing environment or other network or computing system environment, which provides resources to multiple programs or provides resource access to multiple programs, or does both.

"Cloud" means pooled resources for computing, storage, and networking which are elastically available for measured on-demand service. A cloud may be private, public, community, or a hybrid, and cloud services may be offered in the form of infrastructure as a service (IaaS), platform as a service (PaaS), software as a service (SaaS), or another service. Unless stated otherwise, any discussion of reading from a file or writing to a file includes reading/writing a local file or reading/writing over a network, which may be a cloud network or other network, or doing both (local and networked read/write).

"IoT" or "Internet of Things" means any networked collection of addressable embedded computing nodes. Such nodes are examples of computer systems as defined herein, but they also have at least two of the following characteristics: (a) no local human-readable display; (b) no local keyboard; (c) the primary source of input is sensors that track sources of non-linguistic data; (d) no local rotational disk storage—RAM chips or ROM chips provide the only local memory; (e) no CD or DVD drive; (f) embedment in a household appliance or household fixture; (g) embedment in an implanted or wearable medical device; (h) embedment in a vehicle; (i) embedment in a process automation control system; or (j) a design focused on one of the following: environmental monitoring, civic infrastructure monitoring, industrial equipment monitoring, energy usage monitoring, human or animal health monitoring, physical security, or physical transportation system monitoring. IoT storage may be a target of unauthorized access, either via a cloud, via another network, or via direct local access attempts.

"Access" to a computational resource includes use of a permission or other capability to read, modify, write, execute, or otherwise utilize the resource. Attempted access may be explicitly distinguished from actual access, but "access" without the "attempted" qualifier includes both attempted access and access actually performed or provided.

As used herein, "include" allows additional elements (i.e., includes means comprises) unless otherwise stated.

"Optimize" means to improve, not necessarily to perfect. For example, it may be possible to make further improvements in a program or an algorithm which has been optimized.

"Process" is sometimes used herein as a term of the computing science arts, and in that technical sense encompasses computational resource users, which may also include or be referred to as coroutines, threads, tasks, interrupt handlers, application processes, kernel processes, procedures, or object methods, for example. As a practical matter, a "process" is the computational entity identified by system utilities such as Windows® Task Manager, Linux® ps, or similar utilities in other operating system environments (marks of Microsoft Corporation, Linus Torvalds, respectively). "Process" is also used herein as a patent law term of art, e.g., in describing a process claim as opposed to a system claim or an article of manufacture (configured storage medium) claim. Similarly, "method" is used herein at times as a technical term in the computing science arts (a kind of "routine") and also as a patent law term of art (a kind of "process"). "Process" and "method" in the patent law sense are used interchangeably herein. Those of skill will understand which meaning is intended in a particular instance, and will also understand that a given claimed process or method (in the patent law sense) may sometimes be implemented using one or more processes or methods (in the computing science sense).

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided. Steps performed automatically are presumed to include at least one operation performed proactively.

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment. Anomaly explanation operations such as matrix factorization 320, vector distance calculation 706, behavior similarity computation 708, cluster selection 824, and many other operations discussed herein, are understood to be inherently digital. A human mind cannot interface directly with a CPU or other processor, or with RAM or other digital storage, to read and write the necessary data to perform the anomaly explanation steps taught herein. This would all be well understood by persons of skill in the art in view of the present disclosure.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user. Indeed, a user may not even realize that a proactive step by an embodiment was possible until a result of the step has been presented to the user. Except as otherwise stated, any computational and/or automatic step described herein may also be done proactively.

Throughout this document, use of the optional plural "(s)", "(es)", or "(ies)" means that one or more of the indicated features is present. For example, "processor(s)" means "one or more processors" or equivalently "at least one processor".

For the purposes of United States law and practice, use of the word "step" herein, in the claims or elsewhere, is not intended to invoke means-plus-function, step-plus-function, or 35 United State Code Section 112 Sixth Paragraph/Section 112(f) claim interpretation. Any presumption to that effect is hereby explicitly rebutted.

For the purposes of United States law and practice, the claims are not intended to invoke means-plus-function interpretation unless they use the phrase "means for". Claim language intended to be interpreted as means-plus-function language, if any, will expressly recite that intention by using the phrase "means for". When means-plus-function interpretation applies, whether by use of "means for" and/or by a court's legal construction of claim language, the means recited in the specification for a given noun or a given verb should be understood to be linked to the claim language and linked together herein by virtue of any of the following: appearance within the same block in a block diagram of the figures, denotation by the same or a similar name, denotation by the same reference numeral, a functional relationship depicted in any of the figures, a functional relationship noted in the present disclosure's text. For example, if a claim limitation recited a "zac widget" and that claim limitation became subject to means-plus-function interpretation, then at a minimum all structures identified anywhere in the specification in any figure block, paragraph, or example mentioning "zac widget", or tied together by any reference numeral assigned to a zac widget, or disclosed as having a functional relationship with the structure or operation of a zac widget, would be deemed part of the structures identified in the application for zac widgets and would help define the set of equivalents for zac widget structures.

One of skill will recognize that this innovation disclosure discusses various data values and data structures, and recognize that such items reside in a memory (RAM, disk, etc.), thereby configuring the memory. One of skill will also recognize that this innovation disclosure discusses various algorithmic steps which are to be embodied in executable code in a given implementation, and that such code also resides in memory, and that it effectively configures any general purpose processor which executes it, thereby transforming it from a general purpose processor to a special-purpose processor which is functionally special-purpose hardware.

Accordingly, one of skill would not make the mistake of treating as non-overlapping items (a) a memory recited in a claim, and (b) a data structure or data value or code recited in the claim. Data structures and data values and code are understood to reside in memory, even when a claim does not explicitly recite that residency for each and every data structure or data value or piece of code mentioned. Accordingly, explicit recitals of such residency are not required. However, they are also not prohibited, and one or two select recitals may be present for emphasis, without thereby excluding all the other data values and data structures and code from residency. Likewise, code functionality recited in a claim is understood to configure a processor, regardless of whether that configuring quality is explicitly recited in the claim.

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest such as accessing, calculating, computing, deriving, describing, detecting, enhancing, explaining, identifying, implicating, measuring, obtaining, presenting, producing, receiving, selecting, sorting, testing, training, using (and accesses, accessed, calculates, calculated, etc.) with regard to a destination or other subject may involve intervening action such as the foregoing or forwarding, copying, uploading, downloading, encoding, decoding, compressing, decompressing, encrypting, decrypting, authenticating, invoking, and so on by some other party, including any action recited in this document, yet still be understood as being performed directly by the party of interest.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. For the purposes of patent protection in the United States, a memory or other computer-readable storage medium is not a propagating signal or a carrier wave or mere energy outside the scope of patentable subject matter under United States Patent and Trademark Office (USPTO) interpretation of the In re Nuijten case. No claim covers a signal per se or mere energy in the United States, and any claim interpretation that asserts otherwise in view of the present disclosure is unreasonable on its face. Unless expressly stated otherwise in a claim granted outside the United States, a claim does not cover a signal per se or mere energy.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory are not propagating signal or carrier wave computer readable media. Unless expressly stated otherwise in the claim, "computer readable medium" means a computer readable storage medium, not a propagating signal per se and not mere energy.

An "embodiment" herein is an example. The term "embodiment" is not interchangeable with "the invention". Embodiments may freely share or borrow aspects to create other embodiments (provided the result is operable), even if a resulting combination of aspects is not explicitly described per se herein. Requiring each and every permitted combination to be explicitly and individually described is unnecessary for one of skill in the art, and would be contrary to policies which recognize that patent specifications are written for readers who are skilled in the art. Formal combinatorial calculations and informal common intuition regarding the number of possible combinations arising from even a small number of combinable features will also indicate that a large number of aspect combinations exist for the aspects described herein. Accordingly, requiring an explicit recitation of each and every combination would be contrary to policies calling for patent specifications to be concise and for readers to be knowledgeable in the technical fields concerned.

LIST OF REFERENCE NUMERALS

The following list is provided for convenience and in support of the drawing figures and as part of the text of the specification, which describe innovations by reference to multiple items. Items not listed here may nonetheless be part of a given embodiment. For better legibility of the text, a given reference number is recited near some, but not all, recitations of the referenced item in the text. The same reference number may be used with reference to different examples or different instances of a given item. The list of reference numerals is:

100 operating environment, also referred to as computing environment
102 computer system, also referred to as computational system or computing system
104 users, e.g., user of a monitored system 130
106 peripherals
108 network generally, including, e.g., LANs, WANs, software defined networks, clouds, and other wired or wireless networks
110 processor
112 computer-readable storage medium, e.g., RAM, hard disks
114 removable configured computer-readable storage medium
116 instructions executable with processor; may be on removable storage media or in other memory (volatile or non-volatile or both)
118 data
120 kernel(s), e.g., operating system(s), BIOS, UEFI, device drivers
122 tools, e.g., anti-virus software, firewalls, packet sniffer software, intrusion detection systems, intrusion prevention systems, other cybersecurity tools, debuggers, profilers, compilers, interpreters, decompilers, assemblers, disassemblers, source code editors, auto-completion software, simulators, fuzzers, repository access tools, version control tools, optimizers, collaboration tools, other software development tools and tool suites (including, e.g., integrated development environments), hardware development tools and tool suites, diagnostics, and so on
124 applications, e.g., word processors, web browsers, spreadsheets, games, email tools, commands
126 display screens, also referred to as "displays"
128 computing hardware not otherwise associated with a reference number 106, 108, 110, 112, 114
130 monitored computer system, e.g., a system 102 whose resources or activity or both are logged, traced, analyzed, or otherwise monitored to provide or optimize cybersecurity
200 cybersecurity anomaly detection system
202 cybersecurity anomaly detection functionality, e.g., CF adapted for cybersecurity anomaly detection, SIEM intake or similar mechanism for taking in events 214 and send out alerts 212
204 cybersecurity anomaly
206 collaborative filter trained for cybersecurity anomaly detection
208 black box boundary, e.g., interface(s) to a system 200 which lacks explainability
210 anomalousness score
212 anomaly detection result, e.g., a cybersecurity alert; may be in the form of text message, email, visual alert, audible alert, synthesized or recorded voice message, or other communication containing information about an apparent cybersecurity incident, for example
214 event in a monitored computing system
216 lack of explainability 218
218 explainability in human-friendly terms of an alert 212
220 black box
300 aspect of cybersecurity anomaly detection system
302 training vectors used to train system 200; input data for training may include tuples of the form (user, resource, dailycount), for example, where dailycount is the number of times user accessed resource in a given day
304 test vectors used to train system 200; may have the same form as training data 302
306 computational resource, e.g., an item residing in digital storage 112, an interface to one or more computing capabilities, or an interface to one or more networking capabilities, or a combination thereof
308 time period; may be defined as a point in time, as a start time and end time pair, or as a start time and duration pair, for example
310 vector distance, e.g., numeric measure of distance between two vectors or between a vector and a vector cluster or between two vector clusters, under some metric 312
312 vector distance metric
314 cosine vector distance metric
316 Minkowski vector distance metric
318 collaborative filter matrix
320 factorization of matrix 318; may refer to an act of factoring or to a result of factoring
322 latent feature of collaborative filter; may be obtained by factorization 320
324 latent feature vector, namely, vector containing one or more latent features
326 user behavior in or with regard to a monitored computing system
328 vector reflecting or embodying or generated by user behavior 326
330 cluster of user behavior vectors; may also refer to a corresponding cluster of user behaviors or to a cluster of users whose behavior is represented by the cluster of user behavior vectors
332 act of access or attempted access to a resource 306
334 count or other numeric summary of accesses 332; may be implicitly or explicitly limited to accesses in a particular time period 308 or particular system 130 or involving a particular resource 306, for example
336 behavior similarity, e.g., a numeric or enumeration indication of the extent of similarity between behaviors 326, or between vectors 328 or clusters 330
338 behavior similarity threshold, e.g., cutoff for determining whether two vectors 328 or two clusters 330 or a vector and a cluster are close enough to be considered similar for purposes of explainability 218
340 vector generally, e.g., a latent feature vector, a training vector, a test vector, a user behavior vector
400 system 200 further configured to produce explanations 402, or another system configured to enhance explainability 218 as taught herein
402 explanation of an anomaly 204, e.g., a human-friendly description of one or more circumstances around the anomaly 204
404 explainability-enhancement software; may be implemented as a post-processor or extension or interface to a collaborative filtering anomaly detection solution 200, for example
406 change in behavior of one or more users 104
408 organizational context information
410 organizational context
412 role in an organization, e.g., title, department, responsibility description, authority description, or role in a role-based access control sense
414 network interface; includes protocol stack for TCP/IP, HTTPS or other network communication protocol(s)
500 avoided items
502 domain-based explanations
504 predefined activity normality rules
506 dominant non-latent feature 508 identification of dominant non-latent feature(s)
600 structures that may be used in cybersecurity anomaly explanations
602 ULSG structure which indicates that a user left a similarity group
604 a group of users; may also be referred to as a "set" or "cluster"
606 UJSG structure which indicates a user joined a similarity group
608 MCSG structure which indicates membership of a similarity group has changed
610 membership of a group
612 MCDG structure which indicates membership of a dissimilarity group has changed
700 flowchart; 700 also refers to anomaly explanation methods illustrated by or consistent with the FIG. 7 flowchart
702 detect an anomaly using a CF trained for anomaly detection
704 obtain one or more user behavior vectors
706 calculate a distance 310
708 compute a similarity 336
710 produce an explanation 402; may include assembling the text of an explanation and displaying that text, for example
712 describe a behavior change, e.g., by indicating a behavior X and a subsequent behavior Y, or a behavior X and a subsequent lack of X
714 enhance explainability of an anomaly
716 associate an anomaly with a behavior change
718 use an explanation structure that involves a group 604, e.g., a structure shown in FIG. 6
720 present an organization context, e.g., by including info 408 in an explanation
800 flowchart; 800 also refers to anomaly explanation methods illustrated by or consistent with the FIG. 8 flowchart (which incorporates the steps of FIG. 7)
802 measure distance 310 between different users' behaviors
804 measure distance 310 between a single user's behavior at different times
806 train a collaborative filter for anomaly detection
808 test a collaborative filter trained for anomaly detection
810 avoid reliance on rules 504 for explainability 218
812 rely on a specified item for explainability 218
814 avoid reliance on dominant features 506 for explainability 218
816 attempt to access a resource 306
818 succeed in accessing a resource 306
822 identify a user or a group of users, e.g., by user ID or by organizational context info 408
824 select a user cluster; may refer to determining which user behavior vectors belong to a cluster, or to choosing one cluster instead of another cluster
826 sort users according to similarity 336
828 receive vectors through a network
830 avoid reliance on non-latent features for explainability 218
832 derive latent feature vectors, e.g., by matrix factorization
834 implicate an operational role in an anomaly, e.g., by reciting the role in an explanation of the anomaly
836 present an anomaly score 210, e.g., by displaying it
838 any step discussed in the present disclosure that has not been assigned some other reference numeral

CONCLUSION

In short, the teachings herein provide a variety of anomaly explanation functionalities which enhance CF-based anomaly detection systems 200. Cybersecurity anomaly explainability 218 is enhanced, with particular attention to collaborative filter-based anomaly detection 702. An enhanced system 400 obtains 704 user behavior vectors 328 which are derived 832 from a trained collaborative filter 206, computes 708 a similarity measure 336 of user behavior 326 based on a distance 310 between user behavior vectors 328 and a similarity threshold 338, and automatically produces 710 an explanation 402 of a detected cybersecurity anomaly 204. The explanation 402 describes 712 a change 406 in user behavior similarity 336, in human-friendly terms, such as "User X from Sales is now behaving like a network administrator." Each user behavior vector 328 includes latent features 322, and corresponds to access attempts 816 or other behavior 326 of a user 104 with respect to a monitored computing system 130. Users 104 may be sorted 826 according to behavioral similarity 336. Scalable production of explanations is supported. Explanations 402 may associate 716 a collaborative filter anomaly detection result 212 with a change 406 in behavior 326 of an identified 822 user 104 or cluster 330 or other group 604 of users, per specified explanation structures 600. Explanations 402 may also include 720 organizational context information 408 such as roles 412.

Embodiments are understood to also themselves include or benefit from tested and appropriate security controls and privacy controls such as the General Data Protection Regulation (GDPR), e.g., it is understood that appropriate measures should be taken to help prevent misuse of computing systems through the injection or activation of malware into SIEM software. Use of the tools and techniques taught herein is compatible with use of such controls.

Although Microsoft technology is used in some motivating examples, the teachings herein are not limited to use in technology supplied or administered by Microsoft. Under a suitable license, for example, the present teachings could be embodied in software or services provided by other cloud service providers.

Although particular embodiments are expressly illustrated and described herein as processes, as configured storage media, or as systems, it will be appreciated that discussion of one type of embodiment also generally extends to other embodiment types. For instance, the descriptions of processes in connection with FIGS. 7 and 8 also help describe configured storage media, and help describe the technical effects and operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Those of skill will understand that implementation details may pertain to specific code, such as specific thresholds, comparisons, sample fields, specific kinds of runtimes or programming languages or architectures, specific scripts or other tasks, and specific computing environments, and thus need not appear in every embodiment. Those of skill will also understand that program identifiers and some other terminology used in discussing details are implementation-specific and thus need not pertain to every embodiment. Nonetheless, although they are not necessarily required to be present here, such details may help some readers by providing context and/or may illustrate a few of the many possible implementations of the technology discussed herein.

With due attention to the items provided herein, including technical processes, technical effects, technical mechanisms, and technical details which are illustrative but not comprehensive of all claimed or claimable embodiments, one of skill will understand that the present disclosure and the embodiments described herein are not directed to subject matter outside the technical arts, or to any idea of itself such as a principal or original cause or motive, or to a mere result per se, or to a mental process or mental steps, or to a business method or prevalent economic practice, or to a mere method of organizing human activities, or to a law of nature per se, or to a naturally occurring thing or process, or to a living thing or part of a living thing, or to a mathematical formula per se, or to isolated software per se, or to a merely conventional computer, or to anything wholly imperceptible or any abstract idea per se, or to insignificant post-solution activities, or to any method implemented entirely on an unspecified apparatus, or to any method that fails to produce results that are useful and concrete, or to any preemption of all fields of usage, or to any other subject matter which is ineligible for patent protection under the laws of the jurisdiction in which such protection is sought or is being licensed or enforced.

Reference herein to an embodiment having some feature X and reference elsewhere herein to an embodiment having some feature Y does not exclude from this disclosure embodiments which have both feature X and feature Y, unless such exclusion is expressly stated herein. All possible negative claim limitations are within the scope of this disclosure, in the sense that any feature which is stated to be part of an embodiment may also be expressly removed from inclusion in another embodiment, even if that specific exclusion is not given in any example herein. The term "embodiment" is merely used herein as a more convenient form of "process, system, article of manufacture, configured computer readable storage medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole. Distinct steps may be shown together in a single box in the Figures, due to space limitations or for convenience, but nonetheless be separately performable, e.g., one may be performed without the other in a given performance of a method.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used. Similarly, a given reference numeral may be used to refer to a verb, a noun, and/or to corresponding instances of each, e.g., a processor 110 may process 110 instructions by executing them.

As used herein, terms such as "a", "an", and "the" are inclusive of one or more of the indicated item or step. In particular, in the claims a reference to an item generally means at least one such item is present and a reference to a step means at least one instance of the step is performed. Similarly, "is" and other singular verb forms should be understood to encompass the possibility of "are" and other plural forms, when context permits, to avoid grammatical errors or misunderstandings.

Headings are for convenience only; information on a given topic may be found outside the section whose heading indicates that topic.

All claims and the abstract, as filed, are part of the specification.

To the extent any term used herein implicates or otherwise refers to an industry standard, and to the extent that applicable law requires identification of a particular version of such as standard, this disclosure shall be understood to refer to the most recent version of that standard which has been published in at least draft form (final form takes precedence if more recent) as of the earliest priority date of the present disclosure under applicable patent law.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. An explanation system for enhancing cybersecurity anomaly explainability, the explanation system comprising:
  a memory; and
  a processor in operable communication with the memory, the processor configured to perform cybersecurity anomaly explanation steps which include (a) obtaining at least two user behavior vectors, each user behavior vector derived from a trained collaborative filter, each user behavior vector including at least one latent feature used internally by collaborative filtering to represent user behavior based on a user access pattern, each user behavior vector corresponding to at least one behavior of a user with respect to a monitored computing system, (b) computing a user behavior similarity based on a vector distance between user behavior vectors and on a similarity threshold, and (c) producing an explanation of a cybersecurity anomaly which is based at least on a change in the user behavior similarity and which describes the change in the user behavior similarity;

whereby the explanation system enhances explainability of cybersecurity anomalies which are detected using the trained collaborative filter by associating in the explanation a collaborative filter anomaly detection result with a change in behavior of an identified user.

2. The system of claim 1, wherein the user behavior vectors, vector distance, and explanation each reside in and configure the memory, and wherein the user behavior vectors are further characterized in at least one of the following ways:

two of the user behavior vectors identify at least two different users; or two of the user behavior vectors identify the same user and have respective latent features which correspond to behavior of that user at different times.

3. The system of claim 1, wherein the vector distance is calculated using at least one of the following: a cosine similarity, or a Minkowski distance.

4. The system of claim 1, further comprising the trained collaborative filter.

5. The system of claim 1, wherein the explanation resides in and configures the memory, and wherein the explanation is further characterized in that the explanation indicates at least one of the following user behavior similarity changes:

a user whose behavior was similar to behaviors of a group X of other users stopped being similar to behaviors of group X users;

a user whose behavior was not similar to behaviors of a group X of other users started being similar to behaviors of group X users;

membership of a group of users whose behavior is similar has changed; or membership of a group of users whose behavior is not similar has changed.

6. The system of claim 1, wherein the configured processor neither executes nor relies for explainability upon any predefined activity normality rule which is independent of latent-feature-vector-distance-based similarity computation.

7. The system of claim 1, wherein the configured processor neither executes nor relies for explainability upon any presentation of multiple dominant non-latent features other than user identification features.

8. A method for enhancing cybersecurity anomaly explainability, the method comprising automatically:

obtaining at least two user behavior vectors, each user behavior vector derived from a trained collaborative filter, each user behavior vector including multiple latent features used internally by collaborative filtering to represent user behavior based on a user access pattern and which individually or collectively correspond to at least one behavior of a user with respect to attempted or accomplished access to at least one resource of a monitored computing system;

computing a user behavior similarity based on a vector distance between user behavior vectors and on a similarity threshold; and producing an explanation of a cybersecurity anomaly detected by the trained collaborative filter, the explanation being based at least on a change in the user behavior similarity, the explanation describing the change in the user behavior similarity and identifying at least one user or identifying at least one group of users.

9. The method of claim 8, wherein the method further comprises selecting one or more clusters of users based on user behavior vector similarity, and wherein producing the explanation includes identifying at least one cluster in the explanation.

10. The method of claim 8, wherein:

obtaining includes obtaining a user behavior vector of an abnormal user and obtaining user behavior vectors of other users;

computing includes computing user behavior similarities based on distances between the abnormal user behavior vectors and at least some other user behavior vectors; and producing includes producing an explanation which lists N other users whose behavior is most similar to behavior of the abnormal user, with N>=2.

11. The method of claim 8, wherein the method further comprises sorting multiple users according to their respective extent of user behavior similarity to at least one of the following: behavior of another user, or behavior of a set of users.

12. The method of claim 8, wherein the method further comprises presenting an anomaly score in or with the explanation, wherein the anomaly score is a numeric measure of anomalousness generated by use of the trained collaborative filter.

13. The method of claim 8, wherein the method further comprises presenting organizational context information in or with the explanation.

14. The method of claim 8, wherein obtaining includes receiving at least some of the user behavior vectors through a network connection, after the received user behavior vectors have been derived from the trained collaborative filter.

15. The method of claim 8, wherein distance between user behavior vectors does not depend on non-latent vector components.

16. A computer-readable storage medium configured with data and instructions which upon execution by a processor cause an explanation computing system to perform a method for enhancing cybersecurity anomaly explainability, the method comprising:

obtaining a plurality of user behavior vectors derived from a trained collaborative filter, each user behavior vector including multiple latent features used internally by collaborative filtering to represent user behavior based on a user access pattern, each user behavior vector corresponding to at least one behavior of a user with respect to a monitored computing system;

computing a user behavior similarity based on a vector distance between user behavior vectors and on a similarity threshold; and producing a textual explanation of a cybersecurity anomaly, the textual explanation based at least on a change in the user behavior similarity, and the textual explanation describing a change in the user behavior similarity pertaining to at least one user who is identified in the textual explanation.

17. The storage medium of claim 16, wherein producing a textual explanation of a cybersecurity anomaly includes implicating an operational role in the cybersecurity anomaly.

18. The storage medium of claim 16, wherein obtaining the plurality of user behavior vectors includes deriving user behavior vectors from the trained collaborative filter by performing a matrix factorization.

19. The storage medium of claim 16, wherein the method is free of reliance on any predefined domain-based explanation for cybersecurity anomaly explainability.

20. The storage medium of claim 16, wherein is free of reliance on any display of specific dominant features for cybersecurity anomaly explainability.

* * * * *